United States Patent
Satake (10) Patent No.: US 7,568,551 B2
(45) Date of Patent: Aug. 4, 2009

(54) ELECTRIC POWER STEERING CONTROL APPARATUS

(75) Inventor: Toshihide Satake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 179 days.

(21) Appl. No.: 11/702,214

(22) Filed: Feb. 5, 2007

(65) Prior Publication Data

US 2007/0233344 A1 Oct. 4, 2007

(30) Foreign Application Priority Data

Mar. 17, 2006 (JP) ............................. 2006-075116

(51) Int. Cl.
*B62D 5/04* (2006.01)
(52) U.S. Cl. ........................................ 180/446; 701/41
(58) Field of Classification Search ................ 180/443, 180/444, 446, 421, 422, 423; 701/41
See application file for complete search history.

(56) References Cited

U.S. PATENT DOCUMENTS

| | | | | |
|---|---|---|---|---|
| 5,467,281 A | * | 11/1995 | Iwashita et al. | ................ 701/41 |
| 6,032,755 A | * | 3/2000 | Blandino et al. | ............... 701/41 |
| 6,082,482 A | * | 7/2000 | Kato et al. | ................... 180/402 |
| 6,092,012 A | * | 7/2000 | Shimizu | ....................... 701/41 |
| 6,154,696 A | * | 11/2000 | Nishi et al. | ................... 701/41 |
| 7,174,989 B2 | * | 2/2007 | Mori et al. | .................. 180/446 |
| 7,406,375 B2 | * | 7/2008 | Fujita et al. | .................... 701/41 |
| 2005/0236223 A1 | * | 10/2005 | Yokota | ........................ 180/446 |
| 2008/0047775 A1 | * | 2/2008 | Yamazaki | .................... 180/443 |

FOREIGN PATENT DOCUMENTS

| | | | |
|---|---|---|---|
| DE | 102 59 286 A1 | | 9/2003 |
| DE | 696 32 387 T2 | | 4/2005 |
| DE | 198 06 458 B4 | | 11/2005 |
| EP | 1 077 171 A2 | | 2/2001 |
| EP | 1 502 838 A2 | | 2/2005 |
| JP | 11-129927 A | | 5/1999 |
| JP | 2003-291838 A | | 10/2003 |
| JP | 2005-125853 A | | 5/2005 |
| JP | 2005125853 A | | 5/2005 |

* cited by examiner

*Primary Examiner*—Tony H. Winner
(74) *Attorney, Agent, or Firm*—Sughrue Mion, PLLC (57) ABSTRACT

Provided is an electric power steering control apparatus, including: a motor for generating an assist torque for supplementing a steering torque; a steering torque detector for detecting the steering torque; a vehicle speed detector for detecting a speed of the vehicle; an addition command torque receiving portion for receiving an addition command torque; a steering assist torque calculating portion for calculating a steering assist torque for supplementing the steering torque; a target assist torque calculating portion for adding the steering assist torque and the addition command torque together to calculate a target assist torque; and a motor driving portion for driving the motor based on the target assist torque, in which the steering assist torque calculating portion calculates an added value of the steering torque and the addition command torque, and multiplies the added value by a gain corresponding to the vehicular speed to calculate the steering assist torque.

4 Claims, 6 Drawing Sheets

ELECTRIC POWER STEERING CONTROL APPARATUS

BACKGROUND OF THE INVENTION

1. Field of the Invention

The present invention relates to an electric power steering control apparatus for generating, by means of a motor, an assist torque for supplementing a steering torque exerted by a driver.

2. Description of the Related Art

A conventional steering wheel control structure for a motor-steered vehicle is equipped with an electric power steering apparatus for generating, by means of an electric motor, an assist steering torque for turning steering wheels in accordance with an assist steering torque signal (i.e., steering assist torque) output from steering assist torque determining/inputting means (i.e., steering assist torque calculating means). This steering wheel control structure has a left-and-right wheel control means and an anti-torque steerage assist torque determining means (i.e., external device).

The left-and-right wheel control means controls a driving force or a braking force applied to each of left wheels and each of right wheels independently. When there is generated a difference between a control value used by the left-and-right wheel control means to control the driving force or the braking force applied to each of the left wheels and a control value used by the left-and-right wheel control means to control the driving force or the braking force applied to each of the right wheels, the anti-torque steerage assist torque determining means outputs an anti-torque steerage assist torque signal (i.e., addition command torque) for turning the steering wheels in such a direction as to counterbalance torque steerage generated due to the difference between the control values.

The motor is controlled by a signal obtained by adding the assist steering torque signal and the anti-torque steerage assist torque signal together (e.g., see JP 11-129927 A).

A conventional electric steering control apparatus is equipped with a steering torque control means (i.e., steering assist torque calculating means) for controlling a steering torque applied to steering wheels of a vehicle in accordance with a steering operation. This electric power steering control apparatus has a braking force estimating means, a left-and-right braking force difference estimating means, and an assist steering torque applying means.

The braking force estimating means estimates braking forces applied to the respective wheels of the vehicle. The left-and-right braking force difference estimating means estimates a difference between the braking forces applied to each of the left wheels and each of the right wheels, based on the braking forces estimated by the braking force estimating means. The assist steering torque applying means applies an assist steering torque (i.e., addition command torque) to the steering torque control means in accordance with the difference between the braking forces applied to each of the left wheels and each of the right wheels, which have been estimated by the left-and-right braking force difference estimating means (e.g., see JP 2003-291838 A).

A conventional lane traveling support apparatus for a vehicle is equipped with a steering control means capable of operating in accordance with a steering wheel operation performed by a driver and controlling a steering state in accordance with a state in which the vehicle travels on a road surface. This lane traveling support apparatus has a driving lane detecting means, a vehicle state estimating means, a target state quantity setting means, and a disturbance estimating means.

The driving lane detecting means detects a driving lane from images of a road surface continuously captured by an image pickup means. The vehicle state estimating means, which has a vehicle movement model and a road model, estimates a state quantity including a lateral position of the vehicle within the driving lane in accordance with a result detected by the driving lane detecting means, a steering state of the vehicle, and a traveling state of the vehicle, based on the vehicle movement model and the road model. The target state quantity setting means sets a target state quantity for the vehicle based on the steering state and the traveling state of the vehicle. The disturbance estimating means estimates a disturbance amount for the vehicle based on the state quantity estimated by the vehicle state estimating means.

An addition steering torque command value (i.e., addition command torque) is applied to the steering control means based on a difference between the target state quantity set by the target state quantity setting means and the state quantity estimated by the vehicle state estimating means, and on the disturbance amount estimated by the disturbance estimating means. Thus, the vehicle is supported in traveling within the driving lane (e.g., see JP 2005-125853 A).

In the conventional device disclosed in JP 11-129927 A, the value obtained by adding together the steering assist torque for supplementing the steering force exerted by the driver by turning the steering wheels and the addition command torque input from the external device to turn the steering wheels in such a direction as to counterbalance the torque steerage is used as the target assist torque of the motor.

The steering assist torque is calculated by multiplying the steering torque by a gain corresponding to a vehicle speed in a steering assist torque calculating portion. The vehicle speed and the steering torque are input, respectively, from a vehicle speed detector and a steering torque detector, which are connected to the steering assist torque calculating portion.

The operation of the conventional apparatus disclosed in JP 11-129927 A will be described hereinafter with reference to an explanatory diagram of FIG. 6.

Figure 6:
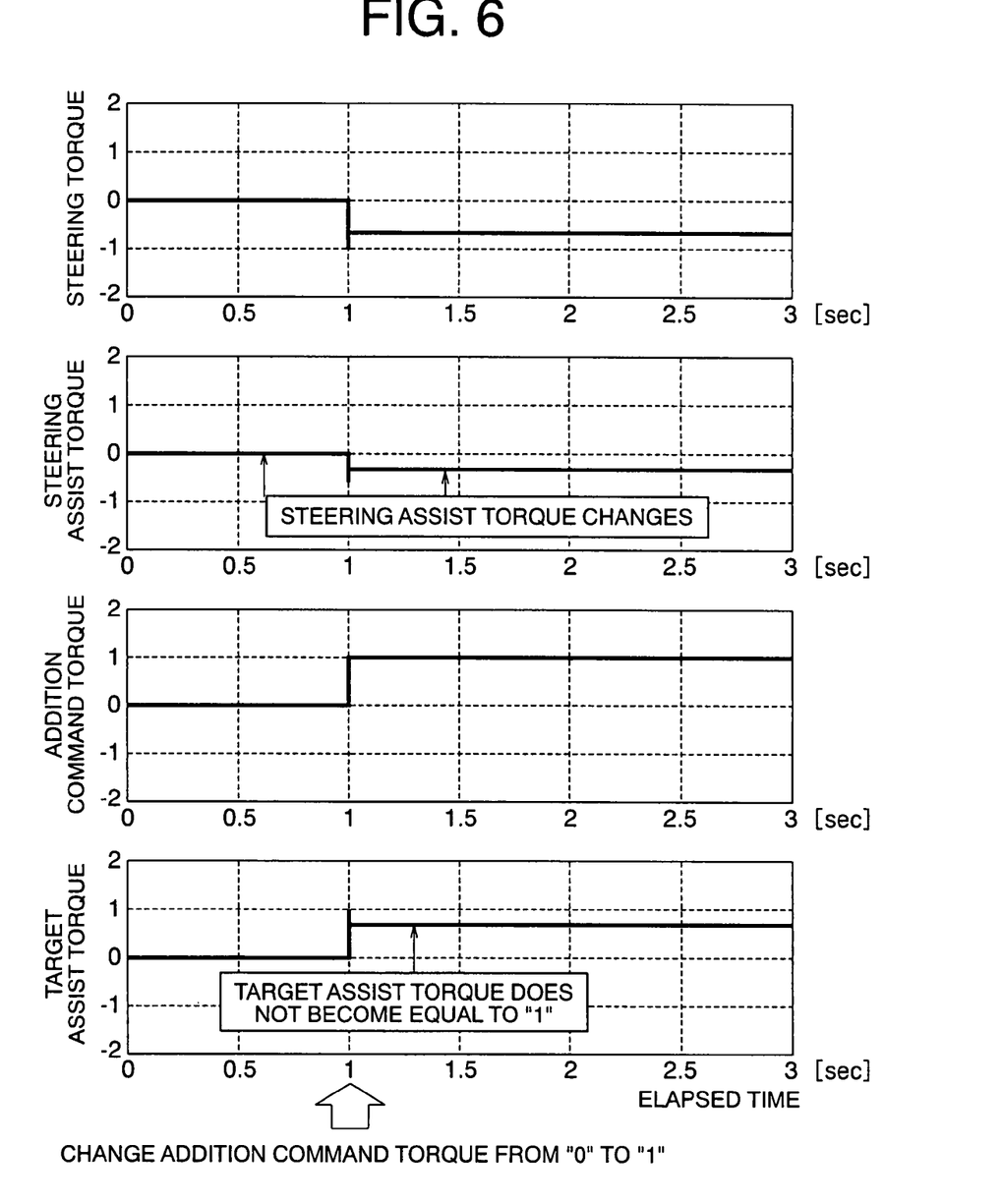
FIG. 6 is an explanatory diagram showing an operation performed by a conventional apparatus disclosed in JP 11-129927 A.

In a case where the addition command torque has been changed from "0" to "1" during straight-ahead traveling of the vehicle and the driver has continued to travel straight ahead while holding the steering wheel, the steering torque, the steering assist torque, the addition command torque, and the target assist torque change as shown in FIG. 6 as time passes.

The addition command torque is set to "0", changed from "0" to "1", and set to "1" when an elapsed time is between 0 [sec] and 1 [sec], equal to 1 [sec], and longer than 1 [sec], respectively.

Referring to FIG. 6, the values of the respective torques corresponding to the elapsed time between 0 [sec] and 1 [sec] will be described first.

Since the vehicle is traveling straight ahead, the steering torque is "0". The steering assist torque, which is calculated by multiplying the steering torque by the gain corresponding to the vehicle speed, is therefore "0".

The addition command torque is set to "0" when the elapsed time is between 0 [sec] and 1 [sec]. The target assist torque, which is calculated by adding the steering assist torque and the addition command torque together, is therefore "0".

Then, when the addition command torque is changed from "0" to "1" as the elapsed time reaches 1 [sec], the target assist torque, which is calculated by adding the steering assist torque and the addition command torque together, is therefore "1".

At this moment, the motor is driven with the target assist torque held at "1", and a motor torque "1" is applied to a steering system.

Next, the values of the respective torques immediately after the change in the addition command torque from "0" to "1", which corresponds to the elapsed time equal to 1 [sec], will be described.

The driver continues to travel straight ahead while holding the steering wheel, so the steering torque is equal to a reaction force of the motor torque "1", namely, "−1". The steering assist torque, which is calculated by multiplying the steering torque by the gain corresponding to the vehicle speed, is therefore equal to a value other than "0".

The addition command torque, which is set to "1" when the elapsed time is longer than 1 [sec], is therefore "1". The target assist torque, which is calculated by adding the steering assist torque and the addition command torque together, is therefore equal to a value other than "1". The motor is driven with the target assist torque equal to the value other than "1", and a motor torque corresponding to this target assist torque acts on the steering system.

Subsequently, the values of the respective torques corresponding to the elapsed time longer than 1 [sec] will be described.

The driver continues to travel straight ahead while holding the steering wheel, and the steering torque, which is equal to a reaction force of the motor torque, is therefore equal to a value other than "−1".

The same operations are thereafter repeated, so the steering torque, the steering assist torque, and the addition command torque converge to values satisfying a relationship: (steering torque+steering assist torque)=−(addition command torque).

As described above, in the case where the addition command torque has been changed from "0" to "1" during, for example, straight-ahead traveling of the vehicle and the driver has continued to travel straight ahead while holding the steering wheel, the steering torque detector detects the reaction force of the motor torque generated due to the change in the addition command torque, so the steering assist torque is generated.

Thus, the ultimate target assist torque (i.e., target assist torque corresponding to the elapsed time longer than 1 [sec] in FIG. 6) does not become equal to "1".

The addition command torque is originally intended to add a predetermined torque to the steering assist torque. However, as described above, when the steering assist torque changes due to the addition of the addition command torque, a change amount of the addition command torque does not coincide with a change amount of the motor torque. Consequently, the object of adding the predetermined torque to the steering assist torque cannot be achieved.

In setting the addition command torque by using the external device, therefore, it is necessary to perform two operations of adjusting an applied torque amount, namely, an operation of adjusting a required applied torque amount and an operation of adjusting an actual applied torque amount (i.e., addition command torque) required for actual generation of the applied torque amount.

The same holds true for JP 2003-291838 A and JP 2005-125853 A.

In the conventional steering wheel control structure for the motor-steered vehicle, the change amount of the addition command torque does not coincide with the change amount of the motor torque, so the two operations of adjusting the applied torque amount need to be performed. As a result, there is a problem in that a considerable length of time is required.

SUMMARY OF THE INVENTION

The present invention has been made to solve the problem mentioned above. It is therefore an object of the present invention to provide an electric power steering control apparatus capable of reducing a time required for operations of adjusting an applied torque amount.

An electric power steering control apparatus according to the present invention includes: a motor for generating an assist torque for supplementing a steering torque exerted by a driver of a vehicle; steering torque detecting means for detecting the steering torque; vehicle speed detecting means for detecting a speed of the vehicle; addition command torque receiving means for receiving an addition command torque input from an external device; steering assist torque calculating means for calculating a steering assist torque for supplementing the steering torque; target assist torque calculating means for adding the steering assist torque and the addition command torque together to calculate a target assist torque of the motor; and motor driving means for driving the motor based on the target assist torque, in which the steering assist torque calculating means calculates an added value of the steering torque and the addition command torque, and multiplies the added value by again corresponding to the speed of the vehicle to calculate the steering assist torque.

In the electric power steering control apparatus according to the present invention, the steering assist torque calculating means calculates an added value of a steering torque and an addition command torque, and multiplies the added value by again corresponding to a vehicle speed to calculate a steering assist torque. Therefore, a change amount of the addition command torque coincides with a change amount of a motor torque, so the time required for operations of adjusting an applied torque amount can be reduced.

DETAILED DESCRIPTION OF THE PREFERRED EMBODIMENTS

Respective embodiments of the present invention will be described hereinafter based on the drawings. In the respective drawings, like reference symbols are assigned to like or corresponding members and portions to describe them.

First Embodiment

Figure 1:
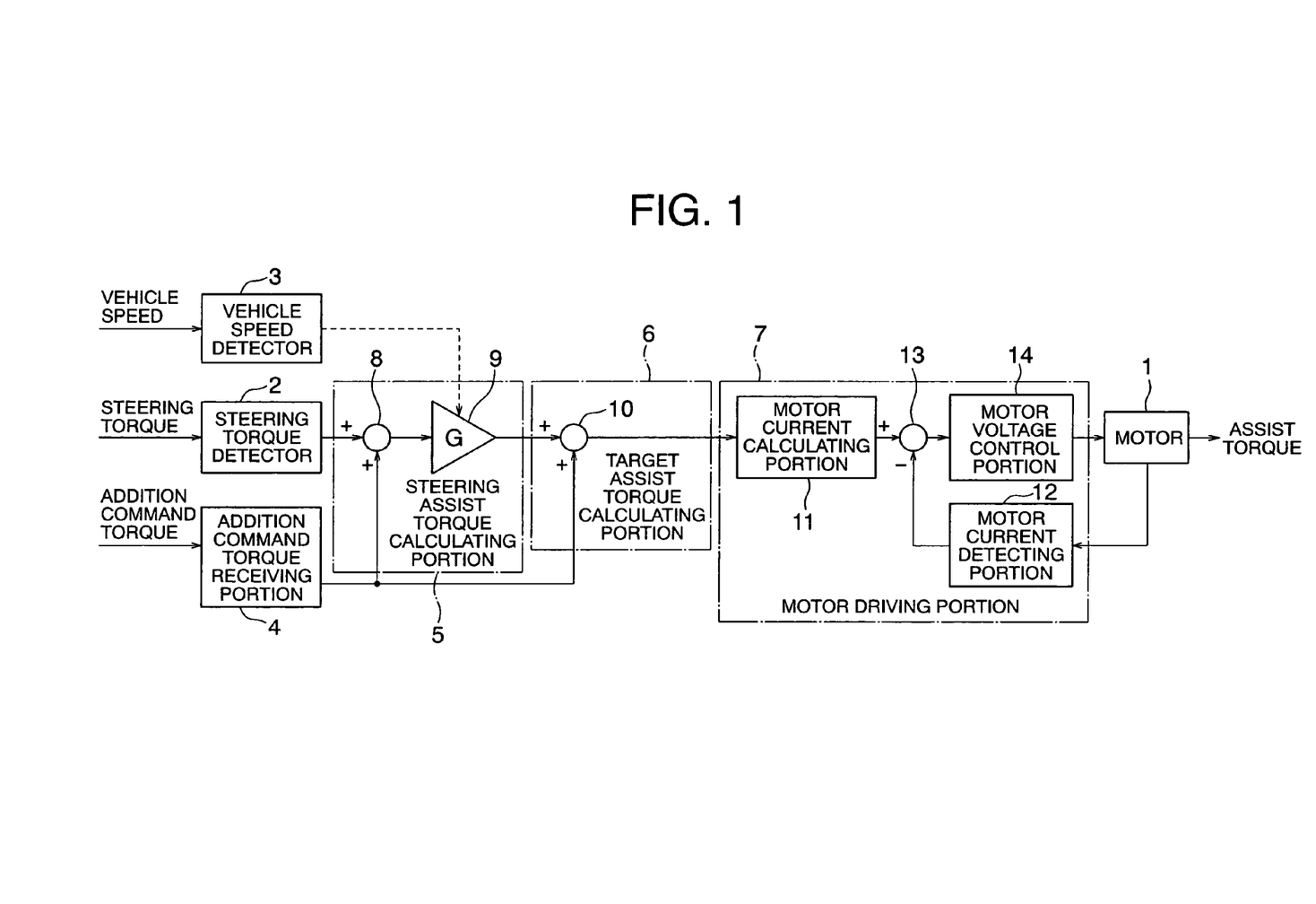
FIG. 1 is a block diagram showing an electric power steering control apparatus according to a first embodiment of the present invention.

FIG. 1 is a block diagram showing an electric power steering control apparatus according to a first embodiment of the present invention.

Referring to FIG. 1, the electric power steering control apparatus is equipped with a motor 1, a steering torque detector 2 (i.e., steering torque detecting means), a vehicle speed detector 3 (i.e., vehicle speed detecting means), an addition command torque receiving portion 4 (i.e., addition command torque receiving means), a steering assist torque calculating portion 5 (i.e., steering assist torque calculating means), a target assist torque calculating portion 6 (i.e., target assist torque calculating means), and a motor driving portion 7 (i.e., motor driving means).

The motor 1, which is driven upon addition of a motor driving voltage (which will be described later) thereto, generates an assist torque for supplementing a steering torque exerted by a driver of a vehicle to drive a steering mechanism (not shown). The assist torque is substantially proportional to a motor driving current, which responds to the motor driving voltage.

The steering torque detector 2 detects a steering torque and outputs a steering torque signal to the steering assist torque calculating portion 5. The vehicle speed detector 3 detects a speed of the vehicle and outputs a vehicle speed signal to the steering assist torque calculating portion 5.

The addition command torque receiving portion 4 receives an addition command torque, which is transmitted from an external device through serial communication, and outputs an addition command torque signal to the steering assist torque calculating portion 5 and the target assist torque calculating portion 6.

In addition to the respective torques disclosed in the foregoing patent documents, that is, JP 11-129927 A, JP 2003-291838 A, and JP2005-125853 A, the addition command torque signal includes, for example, a torque that is output from a vehicle periphery monitoring device as the external device to the electric power steering control apparatus to avoid a collision with an obstacle in front of the vehicle when the vehicle periphery monitoring device has detected the obstacle.

The steering assist torque calculating portion 5 calculates an added value of the steering torque signal and the addition command torque signal, and multiplies the added value by a gain corresponding to the vehicle speed signal, thereby calculating a steering assist torque signal for supplementing the steering torque signal. The target assist torque calculating portion 6 adds the steering assist torque signal and the addition command torque signal together to calculate a target assist torque signal of the motor 1. The motor driving portion 7 drives the motor 1 based on the target assist torque signal.

The steering assist torque calculating portion 5 has an addition portion 8 for calculating the added value of the steering torque signal and the addition command torque signal, and an amplification portion 9 for multiplying the added value by the gain corresponding to the vehicle speed signal.

The gain is stored in a memory (which will be described later) in advance as a value corresponding to the vehicle speed signal.

The target assist torque calculating portion 6 has an addition portion 10 for adding the steering assist torque signal and the addition command torque signal together.

The steering assist torque calculating portion 5 and the target assist torque calculating portion 6 are each designed as a microprocessor (not shown) having a CPU and a memory in which programs are stored.

The motor driving portion 7 has a motor current calculating portion 11 for calculating a motor target current from the target assist torque signal, a motor current detecting portion 12 for detecting a motor driving current flowing actually through the motor 1, a comparison portion 13 for outputting a difference between the motor target current and the motor driving current, and a motor voltage control portion 14 for applying the motor driving voltage to the motor 1 such that the difference between the motor target current and the motor driving current becomes equal to 0.

Figure 2:
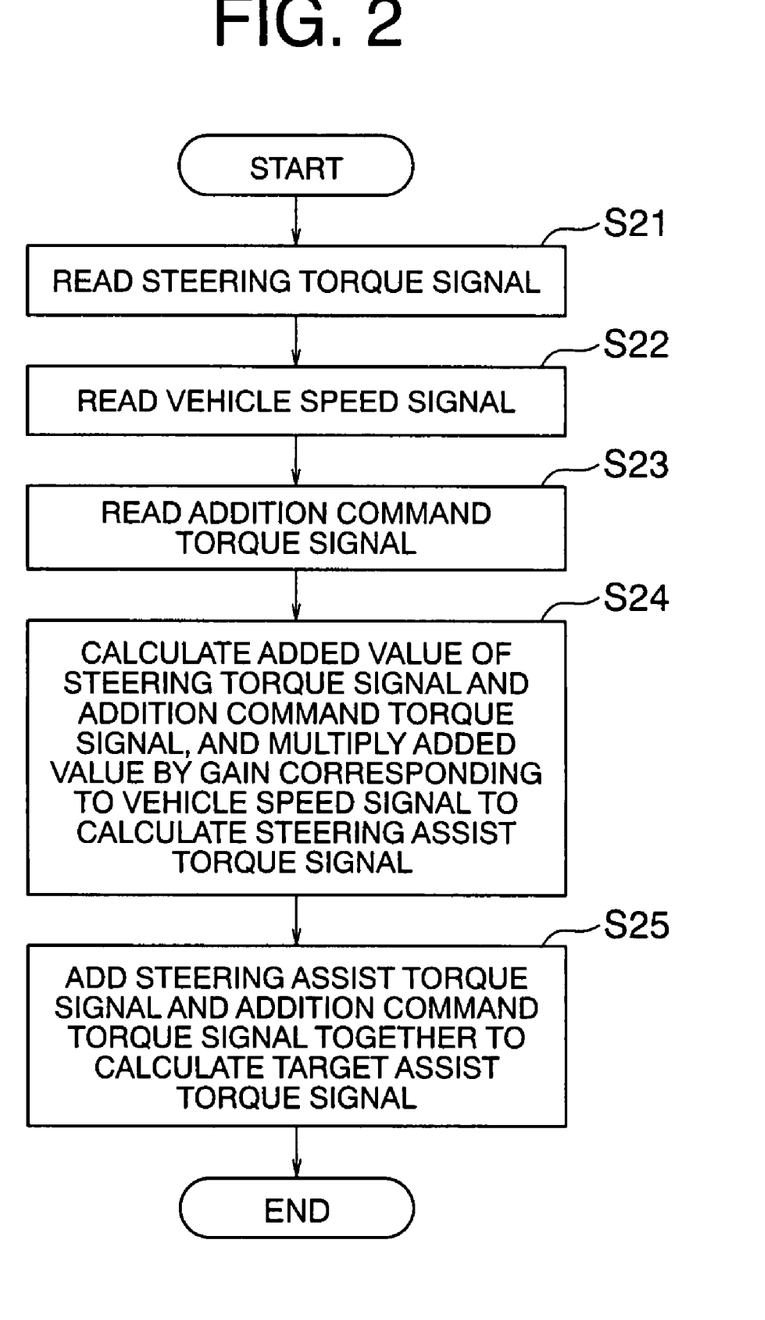
FIG. 2 is a flowchart showing an operation performed by the electric power steering control apparatus according to the first embodiment of the present invention.

The operation of the electric power steering control apparatus according to the first embodiment of the present invention will be described hereinafter with reference to a flowchart of FIG. 2 as well as FIG. 1.

This operation is repeatedly performed on a certain cycle.

The first embodiment of the present invention is characterized in that the addition command torque signal is input to both the steering assist torque calculating portion 5 and the target assist torque calculating portion 6. The motor driving portion 7 and the motor 1 operate in the same manner as in the conventional art.

For the sake of simplicity, therefore, the operations of the motor driving portion 7 and the motor 1 will not be touched on in the following description.

First of all, a steering torque signal detected by the steering torque detector 2 is read and stored into the memory (Step S21).

A vehicle speed signal detected by the vehicle speed detector 3 is read and stored into the memory (Step S22).

Subsequently, an addition command torque signal received by the addition command torque receiving portion 4 is read and stored into the memory (Step S23).

Then, the steering assist torque calculating portion 5 calculates an added value of the steering torque signal and the addition command torque signal, multiplies the added value by a gain corresponding to the vehicle speed signal to calculate a steering assist torque signal, and stores the steering assist torque signal into the memory (Step S24).

Subsequently, the target assist torque calculating portion 6 adds the steering assist torque signal and the addition command torque signal together to calculate a target assist torque signal, and stores the target assist torque signal into the memory (Step S25), thereby terminating the processings of FIG. 2.

The operation of the electric power steering control apparatus according to the first embodiment of the present invention will be described hereinafter with reference to an explanatory diagram of FIG. 3 as well as FIGS. 1 and 2.

Figure 3:
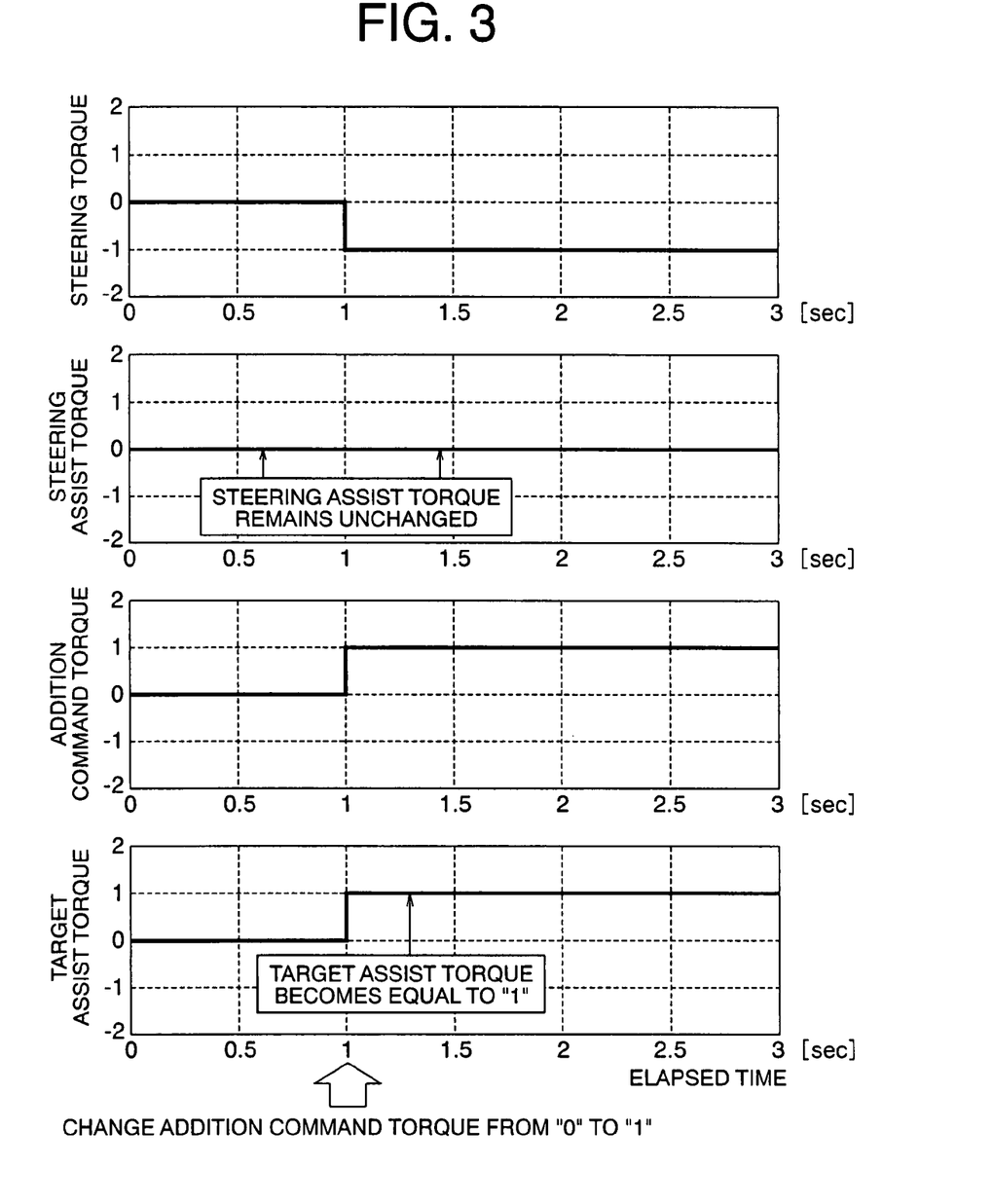
FIG. 3 is an explanatory diagram showing the operation performed by the electric power steering control apparatus according to the first embodiment of the present invention.

In a case where the addition command torque has been changed from "0" to "1" during straight-ahead traveling of the vehicle and the driver has continued to travel straight ahead while holding a steering wheel, the steering torque, the steering assist torque, the addition command torque, and the target assist torque change as shown in FIG. 3 as time passes.

The addition command torque is set to "0", changed from "0" to "1", and set to "1" when an elapsed time is between 0 [sec] and 1 [sec], equal to 1 [sec], and longer than 1 [sec], respectively.

Referring to FIG. 3, the values of the respective torques corresponding to the elapsed time between 0 [sec] and 1 [sec] will be described first.

Since the vehicle is traveling straight ahead, the steering torque is "0". The steering assist torque, which is calculated by multiplying the added value of the steering torque and the addition command torque by the gain corresponding to the vehicle speed, is therefore "0".

The addition command torque is set to "0" when the elapsed time is between 0 [sec] and 1 [sec]. The target assist torque, which is calculated by adding the steering assist torque and the addition command torque together, is therefore "0".

Subsequently, when the addition command torque is changed from "0" to "1" as the elapsed time reaches 1 [sec], the target assist torque, which is calculated by adding the steering assist torque and the addition command torque together, therefore becomes equal to "1".

At this moment, the motor 1 is driven with the target assist torque held at "1", so a motor torque "1" acts on the steering system.

Next, the values of the respective torques immediately after the change in the addition command torque from "0" to "1", which corresponds to the elapsed time equal to 1 [sec], will be described.

The driver continues to travel straight ahead while holding the steering wheel, so the steering torque is equal to a reaction force of the motor torque "1", that is, "−1".

At this moment, the steering assist torque, which is calculated by multiplying the added value of the steering torque and the addition command torque by the gain corresponding to the vehicle speed, is therefore equal to "0".

The addition command torque, which is set to "1" when the elapsed time is longer than 1 [sec], is therefore equal to "1".

The target assist torque, which is calculated by adding the steering assist torque and the addition command torque together, is therefore equal to "1".

The motor 1 is driven with the target assist torque held at "1", so the motor torque "1" acts on the steering system.

Subsequently, the values of the respective torques corresponding to the elapsed time longer than 1 [sec] will be described.

The driver continues to travel straight ahead while holding the steering wheel, and the steering torque is equal to the reaction force of the motor torque, that is, "−1".

The same operation is thereafter repeated.

In the electric power steering control apparatus according to the first embodiment of the present invention, the steering assist torque calculating portion 5 calculates the added value of the steering torque and the addition command torque, and multiplies the added value by the gain corresponding to the vehicle speed. As a result, the steering assist torque can be held at "0".

Thus, the addition command torque "1" is added to the steering assist torque "0", so the ultimate target assist torque (i.e., target assist torque corresponding to an elapsed time longer than 1 [sec] in FIG. 3) can be held at "1". Therefore, even in a case where the driver has continued to travel straight ahead while holding the steering wheel, the steering assist torque remains unchanged despite addition of the addition command torque. Consequently, a change amount of the addition command torque and a change amount of the motor torque can be made to coincide with each other.

Accordingly, the operation of adjusting the actual applied torque amount required for actual generation of the applied torque amount, which is one of the two foregoing operations of adjusting the applied torque amount, can be omitted. As a result, the time required for the operations of adjusting the applied torque amount can be reduced.

According to the description of the foregoing first embodiment of the present invention, the steering assist torque calculating portion 5 multiplies the added value of the steering torque signal and the addition command torque signal by the gain corresponding to the vehicle speed signal to calculate the steering assist torque signal, and the target assist torque calculating portion 6 then adds the steering assist torque signal and the addition command torque signal together to determine the target assist torque signal.

Strictly speaking, therefore, before the steering torque signal fluctuates due to the influence of the addition command torque signal after the change in the addition command torque from "0" to "1", the addition command torque signal is doubly added to the steering torque signal and the steering assist torque signal. However, this is an instantaneous phenomenon and thus has no influence on a steering feeling of the driver.

However, this phenomenon of double addition of the addition command torque signal can also be eliminated.

That is, when the addition command torque signal is changed from "0" to "1", the target assist torque calculating portion 6 adds the steering assist torque signal and the changed addition command torque signal together to calculate a target assist torque signal. After the lapse of a predetermined time calculated through an experiment or the like, which is a time from a moment corresponding to the change in the addition command torque from "0" to "1" to a moment corresponding to fluctuations in the steering torque signal caused due to the influence of the addition command torque signal, the steering assist torque calculating portion 5 changes an addition command torque signal value to be added to the steering torque signal.

In this case, the influence on a steering feeling of the driver can be removed completely.

Second Embodiment

According to the description of the foregoing first embodiment of the present invention, the steering assist torque calculating portion 5 multiplies the added value of the steering torque signal and the addition command torque signal by the gain corresponding to the vehicle speed signal to calculate the steering assist torque signal. The steering assist torque can thereby be held at "0", and the ultimate target assist torque can be made equal to "1". Therefore, even in the case where the driver has continued to travel straight ahead while holding the steering wheel, the steering assist torque signal remains unchanged despite addition of the addition command torque signal.

However, when the driver does not hold the steering wheel, the addition command torque signal is doubly added in the steering assist torque calculating portion 5 and the target assist torque calculating portion 6. In this case, therefore, the target assist torque signal may assume a large value.

Figure 4:
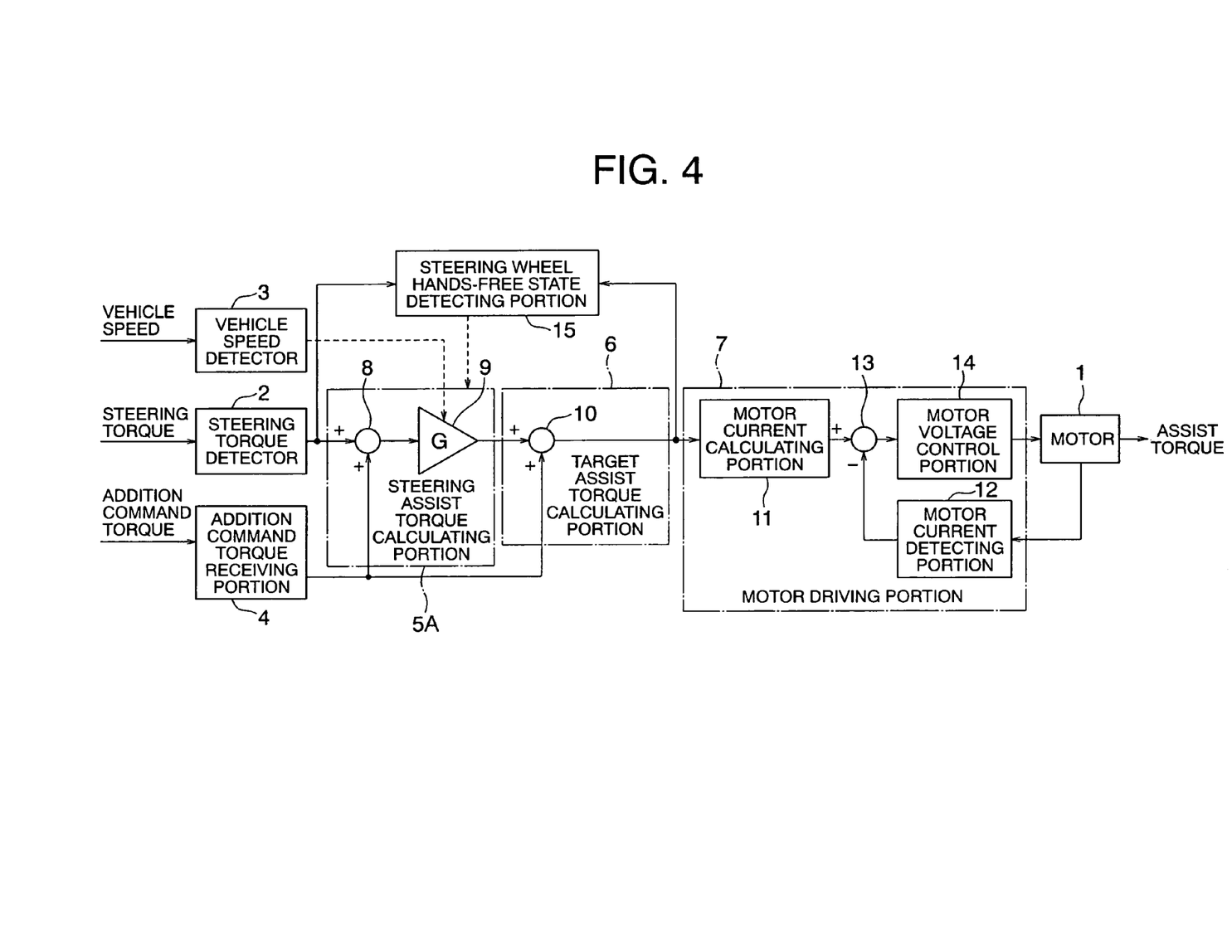
FIG. 4 is a block diagram showing an electric power steering control apparatus according to a second embodiment of the present invention.

Thus, it is desirable to carry out detection of a steering wheel hands-free state of the driver, and refrain from adding the addition command torque signal in a steering assist torque calculating portion 5A when the steering wheel hands-free state (i.e., state in which the steering wheel is not held) is detected.

Processings of prohibiting addition of the addition command torque signal in accordance with the steering wheel hands-free state will be described hereinafter.

Components similar to those of the first embodiment of the present invention are denoted by the same reference symbols accompanied with "A" and will not be described in detail.

FIG. 4 is a block diagram showing an electric power steering control apparatus according to a second embodiment of the present invention.

Referring to FIG. 4, the electric power steering control apparatus is equipped with a steering wheel hands-free state detecting portion 15 (i.e., hands-free state detecting means) for detecting a steering wheel hands-free state of the driver. The electric power steering control apparatus is also equipped with the steering assist torque calculating portion 5A instead of the steering assist torque calculating portion 5. The steering assist torque calculating portion 5A includes an addition prohibiting portion (i.e., addition prohibiting means) (not shown) for prohibiting addition of an addition command torque signal when a steering wheel hands-free state is detected.

The second embodiment of the present invention is identical to the first embodiment of the present invention in other configurational details, which will not be described below.

The steering wheel hands-free state detecting portion 15, to which a steering torque signal and a target assist torque signal are input from the steering torque detector 2 and the target assist torque calculating portion 6, respectively, outputs a detected result to the steering assist torque calculating portion 5A.

The steering wheel hands-free state detecting portion 15 is designed as a microprocessor (not shown) having a CPU and a memory in which programs are stored.

The steering wheel hands-free state detecting portion 15 determines that the steering wheel is in a hands-free state, in a case where the target assist torque signal has remained larger than an arbitrarily set first predetermined torque and the steering torque signal has remained smaller than a second predetermined torque, which is substantially set to "0", for an arbitrarily set predetermined time. Otherwise the steering wheel hands-free state detecting portion 15 determines that the steering wheel is not in the hands-free state (i.e., that steering wheel is in a held state).

In other words, the steering wheel hands-free state detecting portion 15 determines that the steering wheel is in the hands-free state, when the steering torque signal is substantially "0" despite generation of a torque larger than the first predetermined torque by the motor 1.

The target assist torque signal may be a value stored into the memory through the last calculation.

The operation of the electric power steering control apparatus according to the second embodiment of the present invention will be described hereinafter with reference to FIG. 4 as well as FIG. 5.

This operation is repeatedly performed on a certain cycle. Operational steps identical to those of the first embodiment of the present invention will not be described.

First of all, the steering wheel hands-free state detecting portion 15 carries out detection of a steering wheel hands-free state in a manner as described above, and stores a detected result into the memory (Step S31).

Subsequently, the steering assist torque calculating portion 5A acquires the detected result of the steering wheel hands-free state detecting portion 15 to determine whether or not the steering wheel is in the hands-free state (Step S32).

When it is determined in Step S32 that the steering wheel is in the hands-free state (i.e., Yes), the addition prohibiting portion prohibits addition of a steering torque signal and an addition command torque signal, multiplies the steering torque signal by a gain corresponding to a vehicle speed signal to calculate a steering assist torque signal, and stores the steering assist torque signal into the memory (Step S33).

On the other hand, when it is determined in Step S32 that the steering wheel is not in the hands-free state (i.e., No), the steering assist torque calculating portion 5A calculates an added value of the steering torque signal and the addition command torque signal, multiplies the added value by the gain corresponding to the vehicle speed signal to calculate the steering assist torque signal, and stores the steering assist torque signal into the memory (Step S24).

Figure 5:
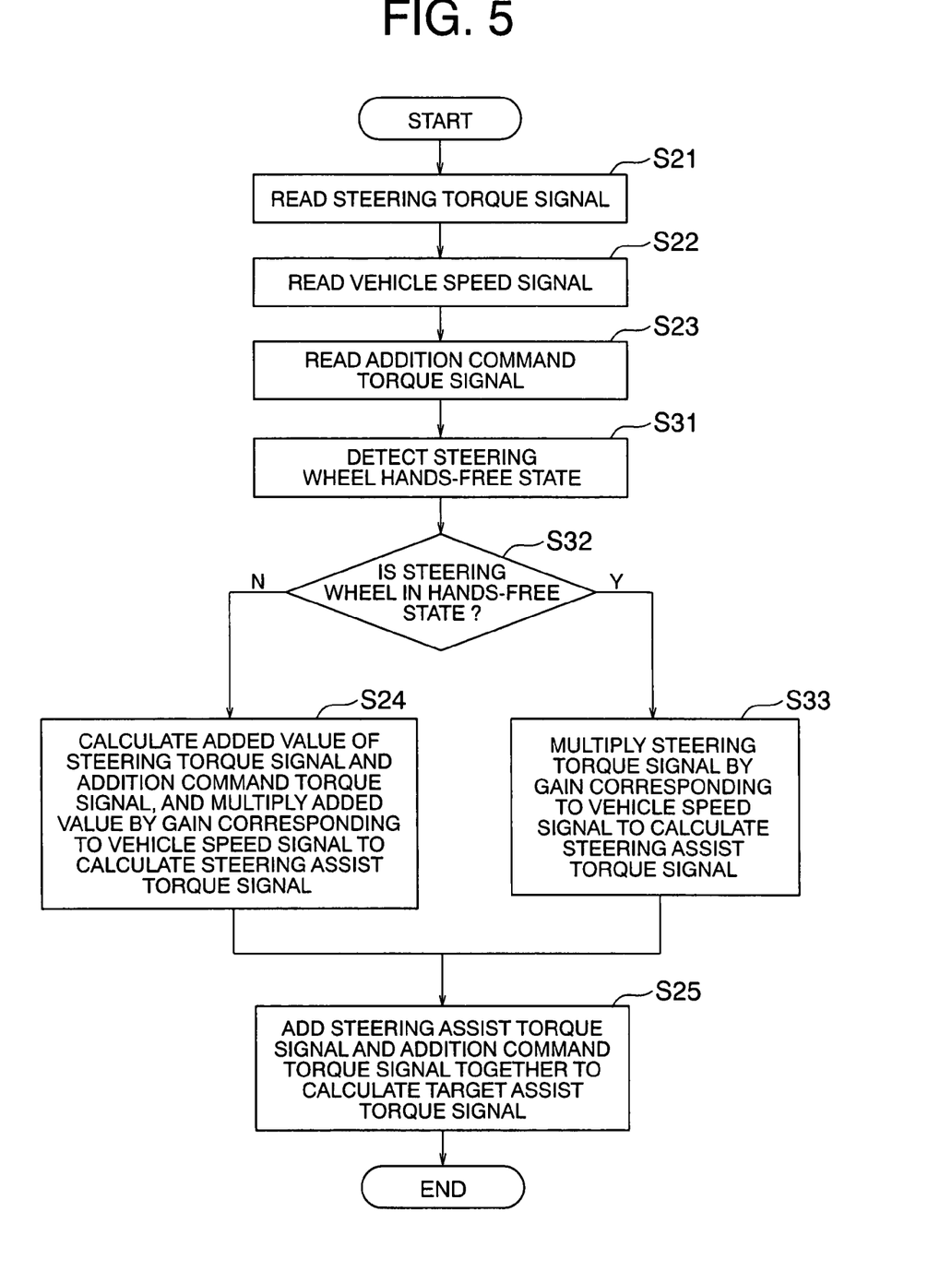
FIG. 5 is a flowchart showing an operation performed by the electric power steering control apparatus according to the second embodiment of the present invention.

The target assist torque calculating portion 6 then adds the steering assist torque signal, which has been calculated in Step S33 or Step S24, and the addition command torque signal together to calculate a target assist torque signal, and stores the target assist torque signal into the memory (Step S25), thereby terminating the processings of FIG. 5.

In the electric power steering control apparatus according to the second embodiment of the present invention, the steering wheel hands-free state detecting portion 15 carries out detection of a hands-free state of the steering wheel, and the addition prohibiting portion prohibits addition of an addition command torque to a steering torque when the hands-free state of the steering wheel (i.e., state in which the steering wheel is not held) is detected.

Thus, a change amount of the addition command torque and a change amount of the motor torque can be made to coincide with each other regardless of whether the steering wheel is in the hands-free state or in the held state.

Accordingly, the operation of adjusting the actual applied torque amount required for actual generation of the applied torque amount, which is one of the two foregoing operations of adjusting the applied torque amount, can be omitted. As a result, the time required for the operations of adjusting the applied torque amount can further be reduced.

According to the description of the foregoing second embodiment of the present invention, the steering wheel hands-free state detecting portion 15 determines that the steering wheel is in the hands-free state, in the case where the target assist torque signal has remained larger than the arbitrarily set first predetermined torque and the steering torque signal has remained smaller than the second predetermined torque, which is substantially set to "0", for the arbitrarily set predetermined time. However, the present invention is not limited to this configuration.

The steering wheel hands-free state detecting portion may determine that the steering wheel is in the hands-free state, only in a case where the steering torque signal has remained smaller than the second predetermined torque, which is substantially set to "0", for the arbitrarily set predetermined time.

A steering wheel angle detector may further be provided. It is also appropriate to determine that the steering wheel is in the hands-free state, in a case where a detected value of the steering wheel angle detector has become larger than an arbitrarily set predetermined angle and the steering torque signal has become smaller than the second predetermined torque, which is substantially set to "0".

In those cases as well, an effect similar to that of the foregoing second embodiment of the present invention can be achieved.

According to the description of the foregoing first embodiment of the present invention and the foregoing second embodiment of the present invention, the target assist torque calculating portion 6 adds the steering assist torque signal and the addition command torque signal together to calculate the target assist torque signal. However, the present invention is not limited to this configuration. The target assist torque calculating portion may further add a torque signal, which results from damping compensation, inertia compensation, return torque compensation or the like as disclosed in, for example, JP 2001-122146 A, to calculate a target assist torque signal.

In this case as well, an effect similar to those of the foregoing first embodiment of the present invention and the foregoing second embodiment of the present invention can be achieved.

What is claimed is:

1. An electric power steering control apparatus, comprising:
- a motor for generating an assist torque for supplementing a steering torque exerted by a driver of a vehicle;
- steering torque detecting means for detecting the steering torque;
- vehicle speed detecting means for detecting a speed of the vehicle;
- addition command torque receiving means for receiving an addition command torque input from an external device;
- steering assist torque calculating means for calculating a steering assist torque for supplementing the steering torque;
- target assist torque calculating means for adding the steering assist torque and the addition command torque together to calculate a target assist torque of the motor; and
- motor driving means for driving the motor based on the target assist torque, wherein
- the steering assist torque calculating means calculates an added value of the steering torque and the addition command torque, and multiplies the added value by a gain corresponding to the speed of the vehicle to calculate the steering assist torque.

2. An electric power steering control apparatus according to claim 1, further comprising hands-free state detecting means for detecting a hands-free state of a steering wheel of the vehicle, wherein:
- the steering assist torque calculating means includes addition prohibiting means; and
- the addition prohibiting means prohibits addition of the addition command torque to the steering torque when the hands-free state of the steering wheel is detected.

3. An electric power steering control apparatus according to claim 2, wherein the hands-free state detecting means determines, based on the steering torque and the target assist torque, that the steering wheel is in the hands-free state, in a case where the target assist torque has remained larger than a first predetermined torque and the steering torque has remained smaller than a second predetermined torque for a predetermined time.

4. An electric power steering control apparatus, comprising:
- a motor for generating an assist torque for supplementing a steering torque exerted by a driver of a vehicle;
- steering torque detecting means for detecting the steering torque;
- vehicle speed detecting means for detecting a speed of the vehicle;
- addition command torque receiving means for receiving an addition command torque input from an external device;
- steering assist torque calculating means coupled to said vehicle speed detecting means, said steering torque detecting means and said additional command torque receiving means for calculating a steering assist torque for supplementing the steering torque;
- target assist torque calculating means for adding the steering assist torque from said steering assist torque detecting means and the addition command torque from said additional torque receiving means together to calculate a target assist torque of the motor; and
- motor driving means coupled to said target assist torque calculating means for driving the motor based on the target assist torque, wherein
- the steering assist torque calculating means calculates an added value of the steering torque from said steering torque detecting means and the addition command torque from said additional command torque receiving means, and multiplies the added value by a gain corresponding to the speed of the vehicle to calculate the steering assist torque.

* * * * *